United States Patent [19]

H.A.M. Van Oijen

[11] Patent Number: 5,918,988
[45] Date of Patent: *Jul. 6, 1999

[54] PRINTING SYSTEM FOR CARRYING OUT PRINT JOBS

[75] Inventor: Adrianus H.A.M. Van Oijen, Eindhoven, Netherlands

[73] Assignee: OCE-Nederland B.V., Ma Venlo, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/569,401

[22] Filed: Dec. 8, 1995

[30] Foreign Application Priority Data

Dec. 9, 1994 [NL] Netherlands ............ 9402088

[51] Int. Cl.$^6$ ........................................ B41J 11/44
[52] U.S. Cl. ................................. 400/76; 395/114
[58] Field of Search ................... 400/61, 76, 71, 400/70; 395/114, 109, 110

[56] References Cited

U.S. PATENT DOCUMENTS

| 5,327,526 | 7/1994 | Nomura | 395/115 |
| 5,467,434 | 11/1995 | Hower, Jr. et al. | 395/114 |
| 5,526,469 | 6/1996 | Brindle et al. | 395/114 |
| 5,580,177 | 12/1996 | Gase et al. | 395/114 |

FOREIGN PATENT DOCUMENTS

| 529808 | 3/1993 | European Pat. Off. | 395/114 |
| 617374 | 9/1994 | European Pat. Off. | 395/114 |
| WO8 906024 | 6/1989 | WIPO | 395/114 |

*Primary Examiner*—Christopher A. Bennett
*Attorney, Agent, or Firm*—Birch, Stewart, Kolasch & Birch, LLP

[57] ABSTRACT

A printing system which receives print jobs and stores them in a memory. The printing system has an interface so that a number of print criteria can be set and altered by an operator. In an automatic mode of operation, only the print jobs satisfying the print criteria set by the operator are printed.

27 Claims, 9 Drawing Sheets

Matrix Sorting 707

| File Name: | Set | | | | | | | | | | | | | | | | | | | | Output |
|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | |
| 1 module1 | – | – | – | – | – | – | – | – | – | – | – | – | – | – | – | – | – | – | – | – | A1-Op |
| 2 module2 | 2 | 2 | 2 | 2 | 2 | 2 | – | – | – | – | – | – | – | – | – | – | – | – | – | – | A1-Tr |
| 3 pcb1 | – | – | – | – | – | – | 3 | – | – | – | – | – | – | – | – | – | – | – | – | – | A2-Op |
| 4 pcb2 | – | – | – | – | – | – | – | – | 2 | – | – | – | – | – | – | – | – | – | – | – | A2-Op |
| 5 pedal | – | – | – | – | – | – | – | – | – | – | – | – | – | – | – | – | – | – | – | – | A1-Tr |
| 6 sideview | – | – | – | – | – | – | – | – | – | – | – | – | – | – | – | – | – | – | – | – | A1-Op |

O.K.    Cancel    Help

FIG. 7B

PRINTING SYSTEM FOR CARRYING OUT PRINT JOBS

BACKGROUND OF THE INVENTION

1. Technical Field of the Invention

The invention relates to a printing system for carrying out print jobs in accordance with a job specification associated with a print job.

2. Description of the Related Art

A system of this kind is described in an international patent application by Kodak, International Publication No. WO 89/06024. This describes an electronic printing system which stores a number of print jobs in a mass memory. The printing system is provided with means for selecting stored print jobs on the basis of a set of print criteria. This set consists of criteria all related to the need for an operator to intervene.

The system described has an unmanned automatic mode of operation in which, on the basis of the print criteria, only those print jobs for which no operator intervention is required are selected for printing. Print jobs for which operator intervention is required are saved and continue to remain in the mass memory until an operator is present who switches the system to a manual mode and then can arrange for all or only selected jobs out of the saved print jobs to be printed.

The advantage of such a system is that print jobs requiring the intervention of an operator are filtered for printing at a later time. In this way it is possible for the printing system to process independently all the print jobs not requiring an operator's intervention. Generally, there is a need to enable a printing system to operate automatically to the greatest extent and for as long as possible and accordingly in a manner to be configured by the user.

However, the above-mentioned printing system only partly provides this.

First, in the system described, the print criteria are restricted to those criteria whereby print jobs requiring the intervention of an operator are filtered out. There is a need to be able to test for several criteria.

In addition, the above-mentioned criteria as such cannot be set or removed by the user. Consequently, it is not possible for the automatic mode to be accurately adapted to environmental requirements.

SUMMARY OF THE INVENTION

An object of the invention is to obviate the above-described disadvantages and to provide a printing system which can operate in an automatic mode and in which, during this automatic mode, it is possible to assess a number of print criteria all of which can be set independently of one another by a user, so that, to a large degree, it is possible to make prints without further involvement of the operator, thus improving the possible uses and versatility of a printing system of this kind.

To this end, the printing system of the present invention is provided with means for selective alteration of the print criteria of the set by a user. The result is a printing system which has an automatic mode of operation which can be accurately adapted by the user to a large number of circumstances.

By offering the user the possibility of separately tuning a large number of different criteria or putting them on or off, an optimal "behavior" for each situation can be set during the automatic mode. This is advantageous both in the situation in which such printing systems have to be used at a large number of places with different requirements and in the situation in which print jobs are received from different departments of an organization at a printing system at a central point.

One embodiment of a printing system according to the present application includes means for selectively printing print jobs in dependence on the job specifications of the other jobs. In this way it is possible to make the selection of a print job dependent on the other print jobs present at that time.

Another embodiment of a printing system of the present application includes preprogramming means for preprogramming a set of print criteria and activation means for activating a preprogrammed set. Preprogramming is intended to mean that in the present case a set of print criteria is input and stored for subsequent recalling and activating at a later time. If a number of operational circumstances are known beforehand, the relevant print criteria for these circumstances can be input, whereafter they can be activated at the appropriate time.

A further alternative embodiment includes a timer to which the activation means is responsive. In this way it is a simple matter automatically to switch to a different mode, so that uniform utilization of the printing system over time is obtained.

Other objects and further scope of applicability of the present invention will become apparent from the detailed description given hereinafter. However it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and, thus, are not limitative of the present invention, and wherein:

FIGS. 7A–7B show two operating screens with a job specification; and

DETAILED DESCRIPTION OF THE PREFERRED EMBODIMENTS

Figure 1:
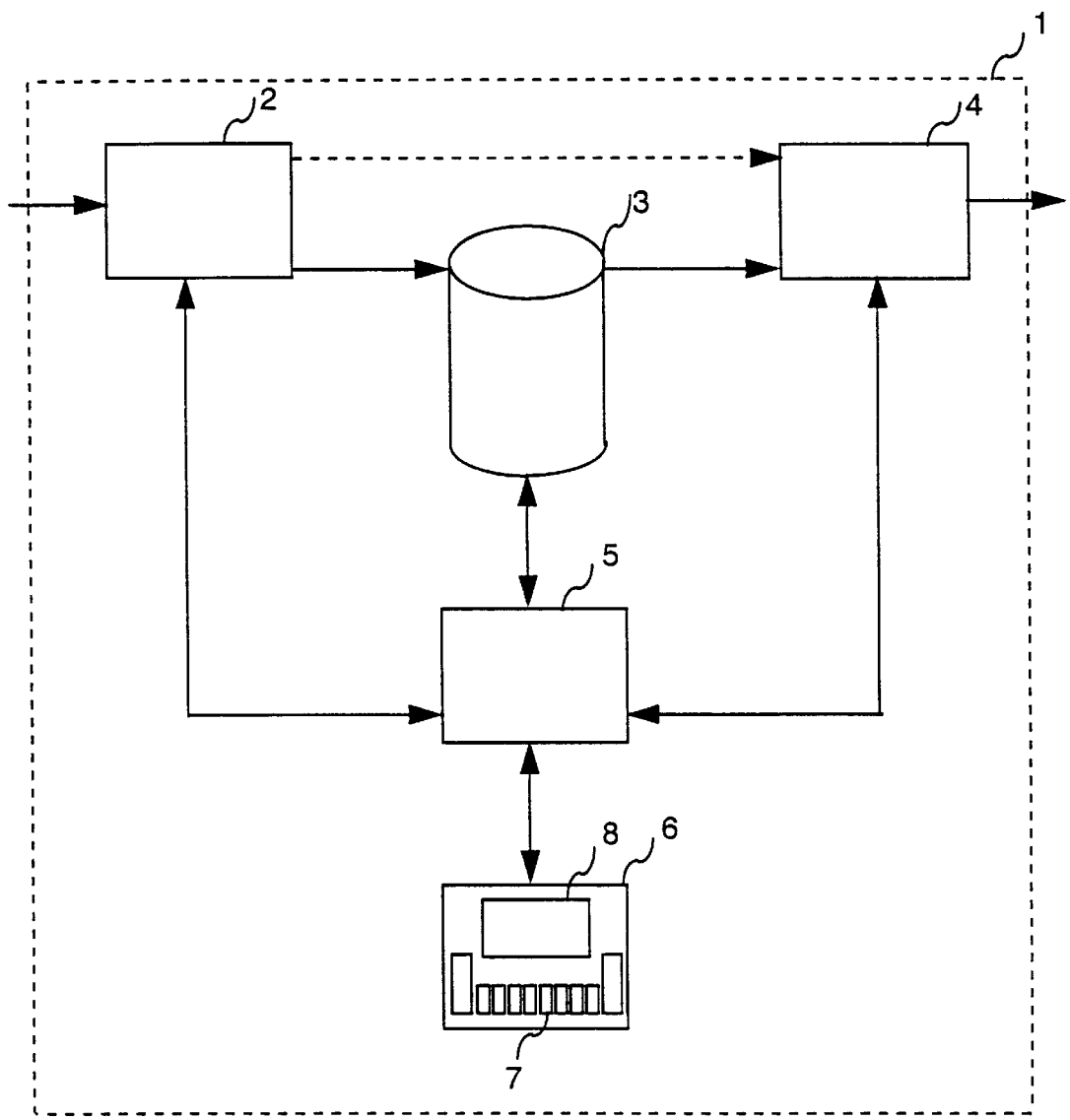
FIG. 1 diagrammatically illustrates a printing system according to the invention.

FIG. 1 diagrammatically illustrates a first embodiment of the printing system 1 according to the invention. The printing system comprises an input device for receiving the supply of a print job, a memory 3 for storing print jobs and a printer 4 for printing print jobs stored in the memory 3. The printer can include memory and an interface, e.g., to a network.

A controller 5 provides for selection of print jobs from the memory 3 and their supply to the printer 4, where they are processed in accordance with the accompanying job specification. Operating interface 6 is connected to the controller 5 and enables a user to change print criteria (from the default values or after such criteria has been initially selected and stored) and to select an automatic or manual mode.

The operating interface 6 preferably includes a number of keys 7 and a display unit 8. A job specification can be input via the input device 2 and via the operating interface 6. The input device 2 (not shown) comprises both a scanner (not shown) for reading in paper originals and an external data receiving unit (or interface) for receiving electronic originals. The printer 4 also comprises a page description language interpreter whereby electronic original images coded in accordance with a given data format, e.g., ASCII or a page description language such as Postscript, can be converted to one or more bit maps suitable for printing.

The printing system comprises a direct and an indirect copying function. In the case of the indirect copying function, the user makes the required settings via the operating interface 6 in accordance with the way in which a print job is to be processed, whereafter the paper originals associated with the job are scanned in. The resulting electronic original images associated with the job and the settings made, which form part of the job specification, are stored in the memory 3. If the print job is next for further processing, then the electronic original images and the associated job specification are transmitted to the printer 4, which further ensures that prints are made in accordance with the job specification. In the case of the direct copying function, the original images input are fed directly to the printer. In the latter case, there is no storage in the memory 3.

The printing system also comprises a printer function. Print jobs, with or without a job specification, are received via the input device 2, which is connected to a data network for example, and are stored in the memory 3. Via the operating interface 6, it is possible to change the job specification, provided that the job is still in the memory 3. Further treatment is identical to the above-described processing of a copying job.

The printing system also comprises a hybrid function, in which a print job is made up of original images originating from the scanner and original images supplied via the external data receiving interface.

Figure 2:
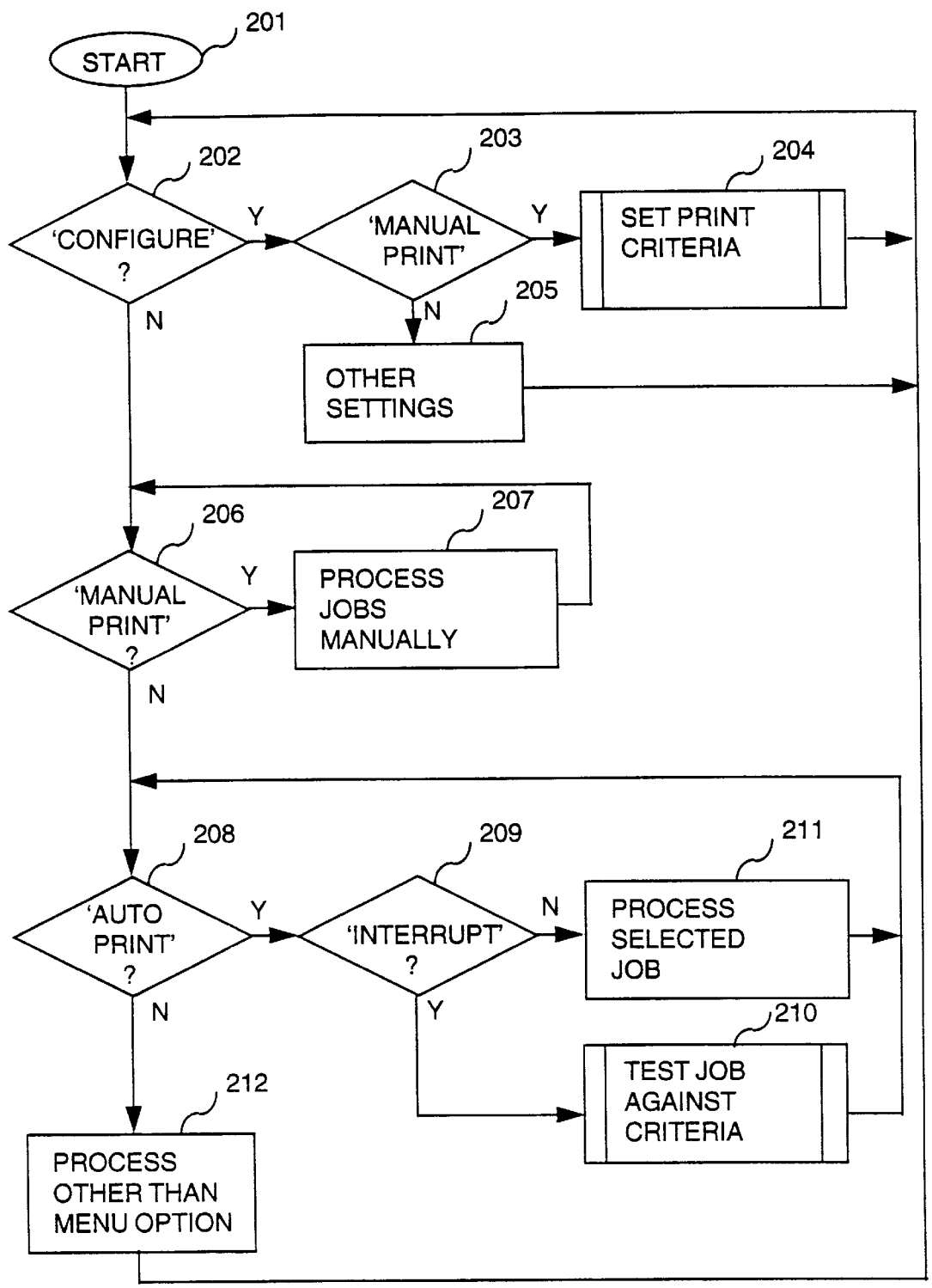
FIG. 2 shows the method of the system with reference to a flow diagram.

The operation of the printing system will now be explained in detail with reference to the flow diagram shown in FIG. 2, and the operating screen shown in FIG. 3.

Starting from the starting position, step 202 tests whether the menu "configure" has been selected. If so (Y), step 203 tests whether the menu "Print Criteria" has been selected.

Figure 3:
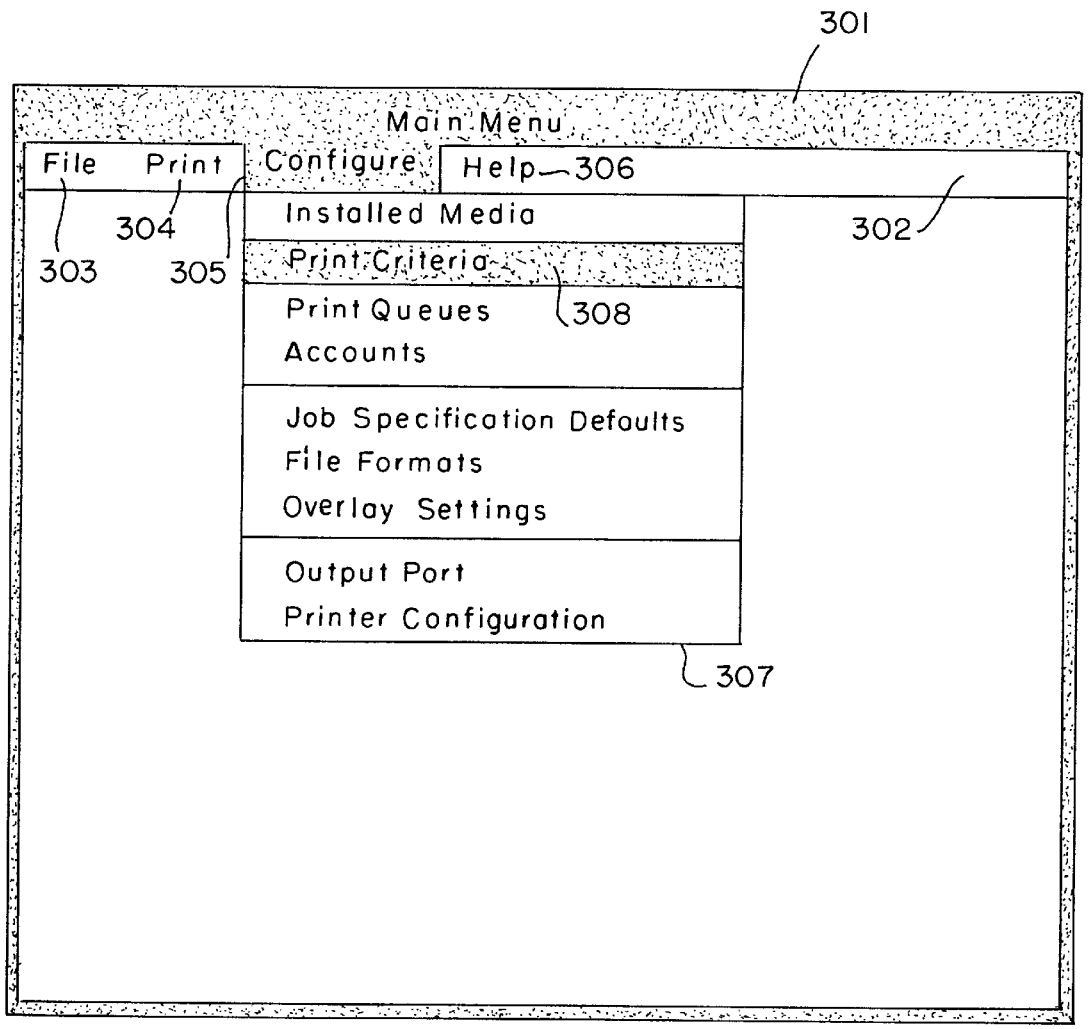
FIG. 3 depicts a first operating screen.

FIG. 3 shows the associated control screen, i.e., the opening screen 301 with a menu bar 302, by which, using a cursor, it is possible to select one of four items, indicated respectively by references 303, 304, 305 and 306. The drawing shows a situation in which the menu "Configure" has been selected (as indicated by the reverse coloration), so that a sub-menu 307 is displayed, in which the item "Print Criteria" 308 has been selected (again indicated by the reverse coloration).

If step 203 shows that the menu "Print Criteria" has been selected (Y), an operating screen (step 204) is displayed, by which the user can set the print criteria.

Figure 4:
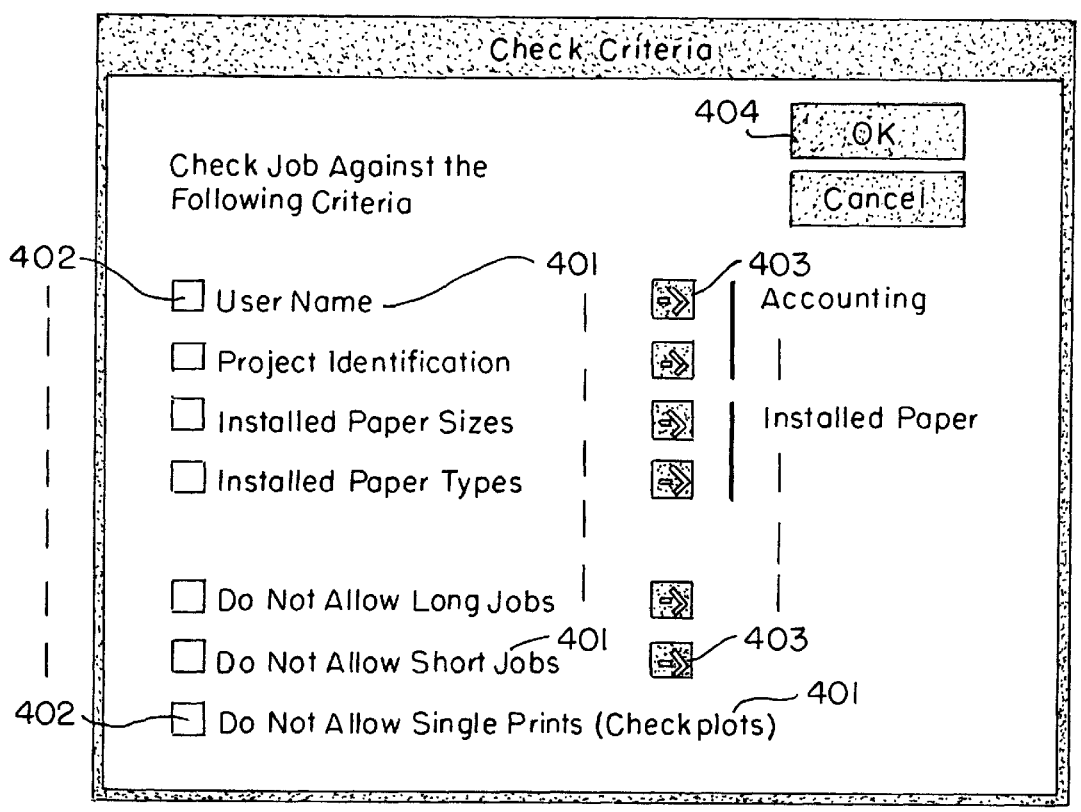
FIG. 4 shows an operating screen on which the operator can selectively set print criteria.

This operating screen is shown in FIG. 4. It displays a number of criteria 401, which can be set on or off by an operator, by selecting a box 402 preceding the criterion. If the criterion "user name" is marked, a check is made whether the job submitter appears on a list. If so, the criterion is satisfied. If not, then the criterion is not satisfied, so that the job will not be selected. If the criterion is not marked, then it is not monitored.

If the criterion "project identification" is marked, a check is made whether the project indicated in the job specification appears on a list of projects. If so, the criterion is satisfied. If not, the job will not be selected. If the criterion is not marked, then it will not be checked.

If the criterion "installed paper sizes" is ticked, a check is made whether the copy formats indicated in the job specification really are available in the machine. If so, the criterion is satisfied. If not, then the job will not be selected. If the criterion is not ticked, then it is not checked. This means that processing takes place in accordance with the way in which the printer 4 is configured. This can mean that printing will be on a different format, with or without format adjustment, or that no printing will be carried out at all. The same applies to the criterion "installed paper type," which in addition to paper of a different weight and/or color this, includes other media, e.g., a transparency.

For the following three criteria, all relating to the job size, a check is first made whether the job belongs to the "long job", "checkplot file" or "short job" type.

If the criterion "do not allow long jobs" is ticked, a check is made whether the job size is such that it must be characterized as a "long job". If this is not the case, then the job satisfies the criterion but if it is the case then it does not satisfy the criterion. In cases in which a job does not satisfy one of the print criteria, the job can be given a marker in the memory 3 related to that property of the job which does not satisfy a criterion. On displaying the jobs present in the memory, this marker clearly shows the operator why a specific job has not been printed. For example, if an job is of the "Checkplot" type, and this type is not permissible, the marker "C" appears with this job so that the operator will see that that is why the job has not been carried out.

It should be noted that the number of print criteria is not restricted to the criteria displayed in this embodiment. A print job is determined by a job specification. A job specification of this kind comprises a number of parameters each determining a specific aspect of the job. Each of these parameters or combination thereof is suitable for defining one or more corresponding criteria, and then if the criterion is selected by the user the relevant parameter or combination is checked.

Examples of such parameters, in addition to those indicated above, are priority, data format (PDL, CCITT Gr.4 etc), pen, color, fold, staple, reinforcement, punch, glue, bind-in, laminate and quantity of copy material required. In the latter case, the criterion involved checks whether sufficient copy material is present so that a job can be processed without it being necessary to add to the stock of material.

For each criterion, the user by selecting a box 403 is offered the opportunity of changing settings relating to the associated criterion. For the criterion "user name" this gives access to one or more lists of users permitted to execute print jobs.

In a variant, the list consists of user names and permits for job parameters coupled with a user name. Flags are set for these parameters and the flags are also checked during the checking process.

For the "long job" and "short job" criteria, the definition relating, for example, to the number of copy sheets to be printed, can be changed.

If the operator has completed the settings, he selects the "OK" box indicated by reference 404. The settings made are then stored in a register. The opening screen is then again displayed on the display unit 8 on operating panel 6. The flow diagram then returns to the starting position. If the menu "Print Criteria" is not selected in step 203 (N), then in step 205 one of the other configuration menus is processed, and then returns to the starting position.

If the configuration menu is not selected in step 202 (N), step 206 checks whether the manual printing mode has been set. This is selected by selecting the "Print" menu in the opening screen. This selection shows a sub-menu in which the operator can choose between the automatic and manual print modes. If the manual print mode has been selected (Y), the printing system passes to the manual condition (207), where the user can select print jobs from the memory whereafter, after giving a print command, the print job is carried out in accordance with the job specification.

If step 206 shows that the manual printing mode has not been selected (N), step 208 checks whether the automatic print mode has been selected. In that case (Y), step 209 checks whether an interrupt flag is set for renewal of a selection status of the print jobs stored in the memory. If the interrupt flag is set (Y) step 210 checks the selection status of each print job and adapts it if necessary. The interrupt flag is unset and step 208 is again executed. Step 210 will be discussed in greater detail hereinafter. If the interrupt flag is not set (N), then in step 211 there is selected from the memory a print job having a positive selection status; this print job is fed to the printing means and carried out in accordance with the job specification.

After this is successfully concluded, the print job is removed from the memory and the process moves to step 208. As long as the automatic process is still selected, the steps 208, 209 and 211 are traversed and the print jobs are processed successively.

A timer sets the interrupt flag at specific times. At those times step 210 is performed, in which the selection status of the print jobs is renewed.

If step 208 finds that the automatic mode has not been selected, then any other menus selected by the user or input jobs are processed in step 212, after which the process returns to the starting position 201.

Figure 5:
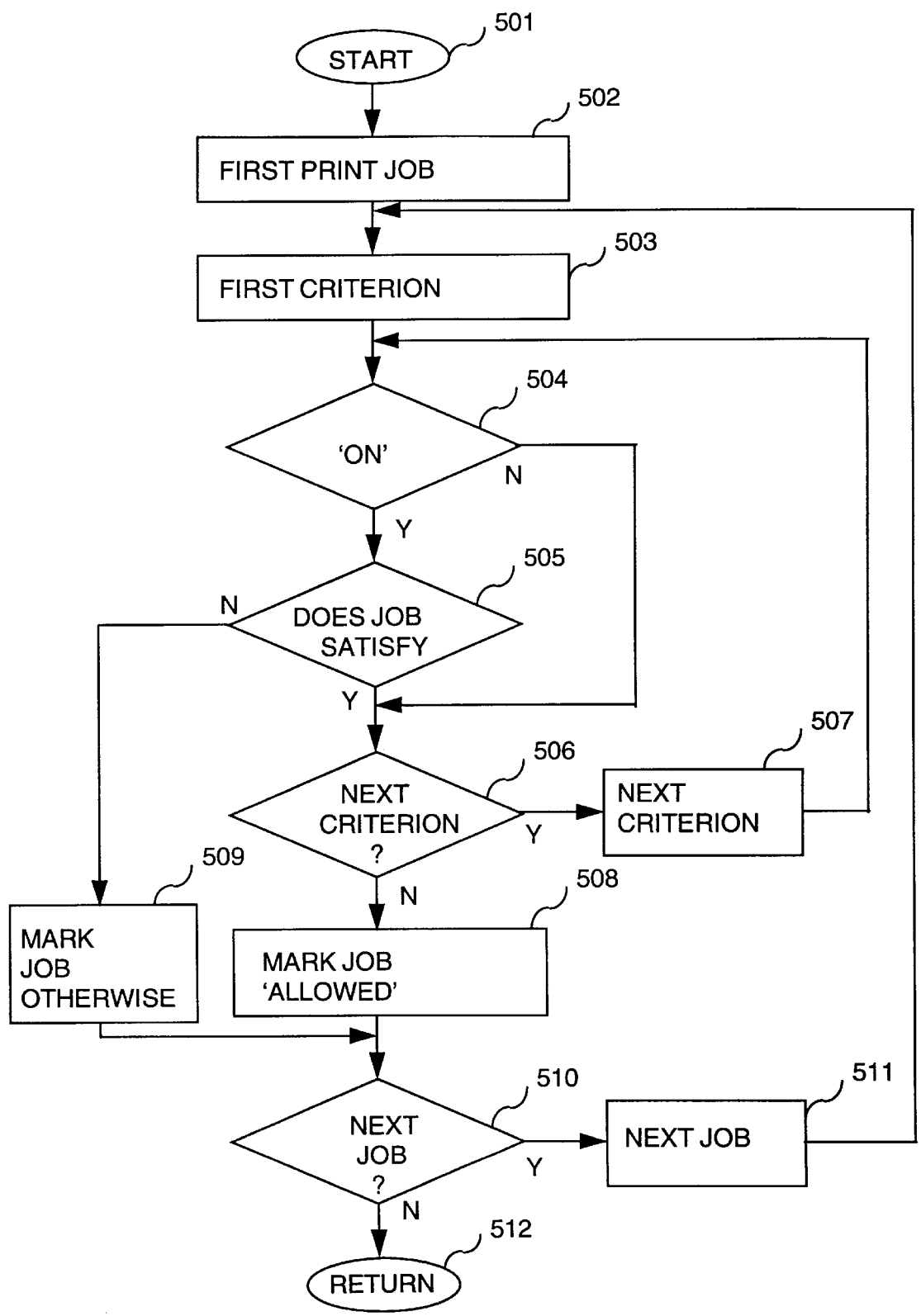
FIG. 5 is a flow diagram showing the method of determining selection status of print jobs stored in the memory.

The method of step 210, in which the selection status of each print job is determined, will now be explained with reference to FIG. 5. In other words, FIG. 5 shows how a print job is selected by evaluating criteria. Starting from the starting position denoted by reference 501, the first print job for treatment is read in step 502. The first criterion is processed in step 503. Step 504 checks whether this criterion has been put "on", i.e., selected or ticked, by the user. If so (Y), step 505 checks whether the print job satisfies the criterion set. If so (Y), step, 506 checks whether there is a following criterion. If so (Y), step 507 is performed. If step 504 finds that the criterion has not been put "on" by the user (N), no check takes place and the method proceeds directly with step 506. If this step finds that there is no following criterion (N), step 508 marks the print job as "allowed" and proceeds to step 510. If step 505 shows that the print job does not satisfy the criterion then the program proceeds to step 509, in which the job is marked according to the tested criterion.

If the job is, for example, of the "Checkplot" type and if this type is excluded by the associated criterion being ticked, then this job is marked with the letter "C". This job will not be carried out and, by way of the letter "C" displayed in the queue, the operator is informed of the reason why the job has not been carried out. Step 510 then checks whether there is a following print job present in the memory. If so (Y), the next job for treatment is read in step 511; if not (N), all the print jobs have been checked and the final position 512 is reached.

It should be noted that step 210 can also be performed in other ways. For example, by including the print criteria in a number of "logic" rules, e.g., in the form of a number of "if (expression) then . . . else . . . " rules. An "expression" is a print criterion which delivers TRUE or FALSE after evaluation. All the parameters associated with a print job and of which a large number are to appear in the job specification, are suitable for acting as a criterion and can be included in such an "expression". An expression can comprise a number of logic operators.

In the following example:

If (((user =='nau') && (size>A3))‖
((dept !='ad') && (media =='special')))
then status:='not allowed'
else status:='allowed';

user "nau" may print only jobs of a maximum size of A3 and the division "ad" (advertising) is the only division which may print on special paper. The printing system may comprise a device for inputting such rules by the operator, who is thus offered the opportunity of selecting from all the suitable parameters a required selection of criteria against which a print job must be tested.

A variant of the system indicates, for each user in the list of users, what options are allowed for that user. Examples of such options are the use of special media types, a maximum permissible job length for that user, the job types allowed for that user (e.g., only checkplots) and so on. By way of the job specification, a check is made whether the user is keeping within the permissible options.

In a following variant, the operator has the possibility of defining a number of sets of print criteria and then storing them, whereafter one of the sets can be recalled and activated.

In a situation in which specific circumstances regularly recur, a set of this kind can be defined for each circumstance. Then, when circumstances change, it is possible to switch over rapidly to another set of print criteria which are most suitable for the requirements.

Switching over to another set of print criteria can also be carried out under the control of a timer set by the operator. This makes it possible to process selectively determined print jobs at specific times of the day, night, or on specific days of the week. In yet another variant, all those jobs which are selected are temporarily stored in a register. When all the jobs have been checked, a second selection operation takes place on a preferred criterion. One example of such a preferred criterion may be that the format requested must correspond to the format available on the machine. Only then will all the print jobs be processed which are printed exactly on the correct paper format. If no single print job satisfies this criterion, then the other print jobs selected in the first operation are processed.

In order further to improve the automatic mode of operation, step 211, in which a print job is selected for printing from the print jobs having a positive selection status, determines a sequence in which the print jobs are processed on the basis of the print jobs having a positive selection status, so that optimal throughput is obtained.

The throughput is limited, on the one hand, by the maximum processing speed of an engine contained in the printer 4, e.g., expressed as the maximum number of prints on A0 format per minute, and on the other hand by the time required to interpret a print job, i.e., converting to bit maps which are printed in the data format of the original images associated with the print job.

Interpreted print jobs are stored in a buffer until they are printed. If a print job has to be printed n times, in accordance with the associated job specification, then the interpreted print job is read out of the buffer and printed n times, although it only requires interpreting once.

The situation in which a preceding print job has already been processed while a following print job is still involved in the interpretation process is undesirable from the productivity aspect. It is desirable that the maximum processing speed should be achieved as closely as possible. To this end, a print job having a certain interpretation time is preceded by one or more print jobs having a total processing time substantially equal to the said interpretation time. Consequently, during the time that a following print job is being interpreted the printer 4 is continuously involved in printing one or more preceding jobs, whereupon, when the interpretation process is completed, the print job can then be printed.

In order to achieve the above, the system determines or estimates the interpretation time and the processing time for each selected print job, and on the basis thereof determines a sequence to give an optimum throughput. The first print job from the resulting sequence is then interpreted and then printed. If new print jobs having a positive selection status are added, then a new sequence is determined.

It should be noted that the above steps are not limited to the configurations described in this application, but that the steps can be applied in all cases in which a set of print jobs is available for processing.

Figure 6:
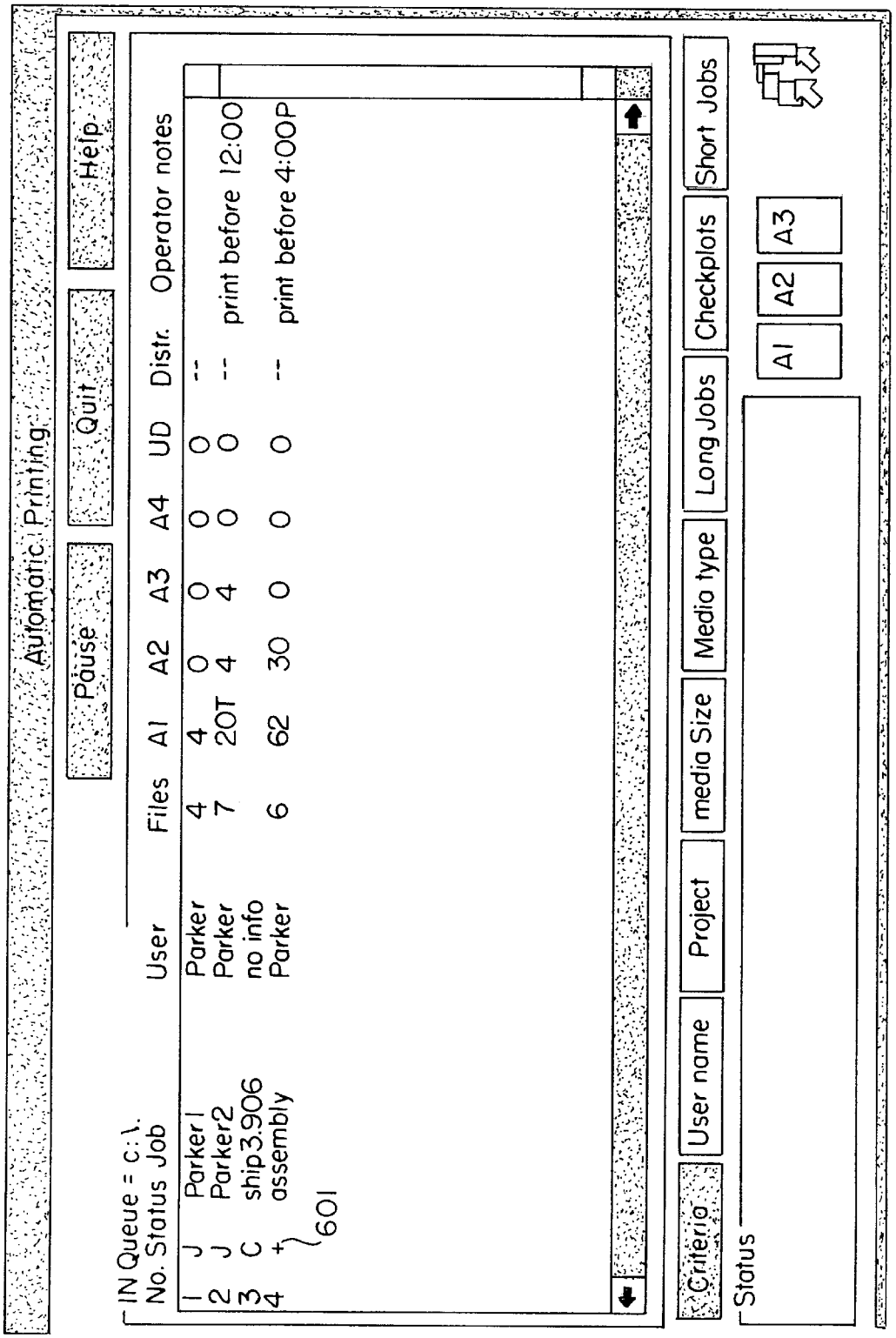
FIG. 6 is an operating screen showing the print jobs stored in the memory.

FIG. 6 shows an operating screen which in the automatic mode displays the print job stored in the memory, the column "Status" (601) having the symbol "+" to indicate that the job has been selected for printing. If a job has not been selected because it does not satisfy the printing criteria, this is indicated in the same column by the symbol "J", "S" and "C" for a long job, a short job and a checkplot respectively.

Figure 7A:
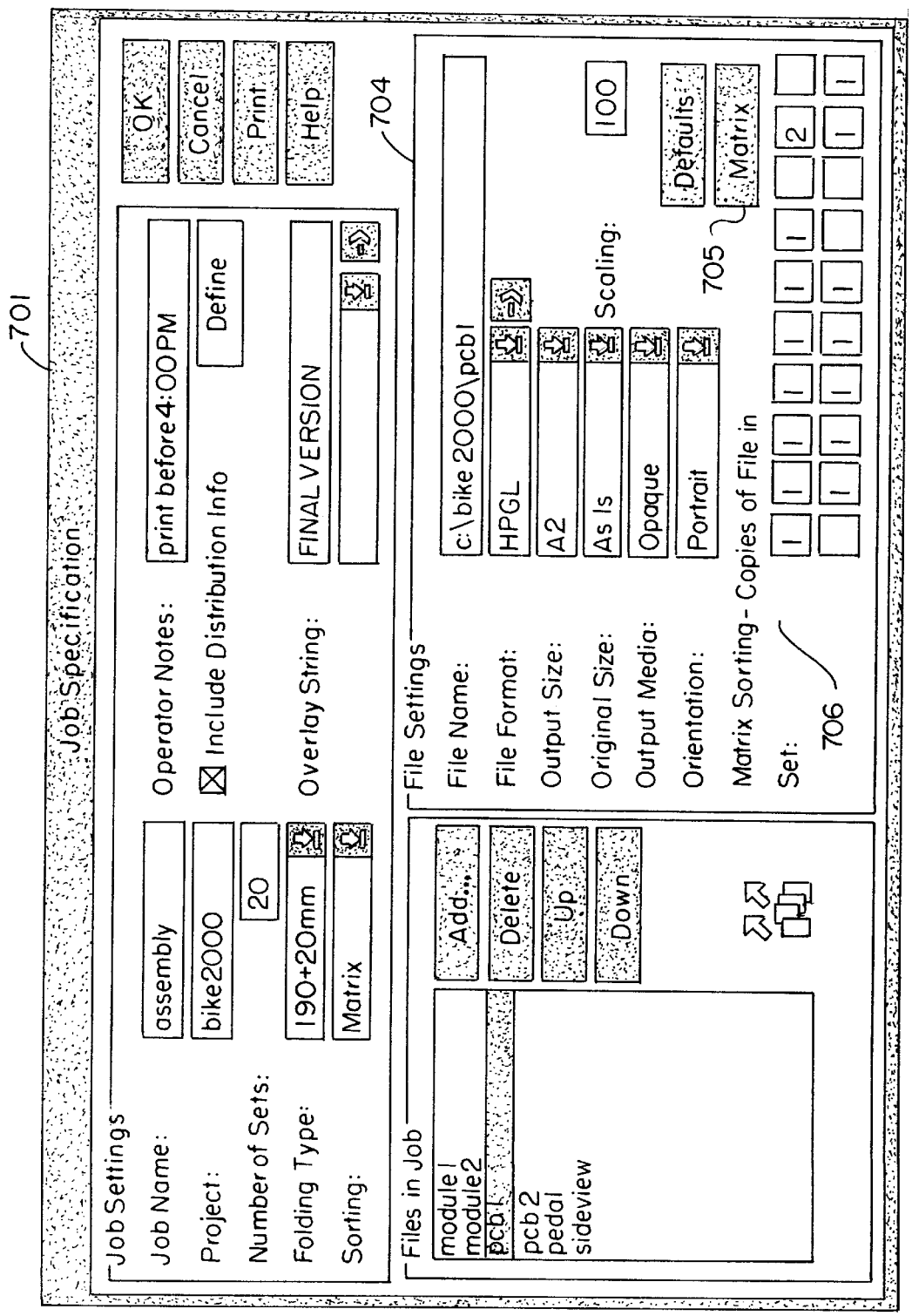

FIGS. 7A–7B show two operating screens relating to a job specification to the extent that this is displayed to the operator. These screens may be recalled at different places of the menu and give the operator the possibility of changing the job specification. Such screens do not exist for a job of the "checkplot" type, so that the operator cannot make any changes to jobs of this type. The "Job Specification" screen of FIG. 7A, indicated by reference 701, comprises three sub-screens, "Job Settings" (702), "Files in Job" (703) and "File Settings" (704).

The sub-screen "Files in Job" 703 indicates what files form part of the job and in what sequence. A file comprises one or more original images which may or may not be encoded according to a specified data format. The operator has the possibility of adding, removing and moving files. The sub-screen "File Settings" 704 displays a number of properties of a file selected in sub-screen 703, e.g., memory location, name and data format and a number of print settings, such as copy format and copy medium. The sub-screen "Job Settings" 701 displays a number of properties of the job in settings which relate to the entire job, e.g., the number of sets required and if sorting is required and, if so, in what manner.

The example illustrated in the Job Settings screen 702 of FIG. 7A shows that matrix-sorting is required. If this option is selected, then after the box 705 has been selected the screen "matrix sorting" (FIG. 7B, 707) is displayed.

Matrix sorting 707 gives the user the possibility of indicating how many prints, including none, of an original image or a file are to be included in each set. A set corresponds to a single run or a job therein. The ratio of components, i.e., files, in the job can be varied. This number of prints is displayed on a cell of the matrix of which the vertical axis corresponds to one of the original images or to one of the files comprising the job and the horizontal axis corresponds to the sets, i.e., jobs to be run.

The screen illustrated in FIG. 7B, for example, shows that set 3 contains a print of the first file, two prints of the second file and a print of each of the other files. The operator has the possibility of selecting a cell and introducing a number therein. He also has the possibility of indicating for the present file in the sub-screen "Files Settings" 704, in the field "Matrix Sorting—Copies of File in Set" (706), the number of copies to be placed in a specific set. Matrix sorting is advantageous inter alia if a number of copy sets are to be made from one job, the various sets going to different clients having different interests in the composition of the job.

If the files in the job relate to a complex project, then a department or user concerned with safety will be interested in different files from another department responsible for the total construction.

Matrix sorting provides a possibility of processing in one print job a number of sets which would otherwise have to be formed separately. Matrix sorting is not confined to the configuration outlined here for a printing system, but is applicable generally as a form of sorting.

An improvement to the printing system comprises pre-programming job specifications. For this purpose a job specification is input and then stored in a specification buffer. A job specification stored in this way can then be recalled from the buffer as required and be combined with original images to form a print job which is then processed further. Inputting the job specification takes place by the operator inputting settings and then giving the command for these settings to be stored, or by sending the job specification in the form of electronic data to the printing system, where the control unit ensures that the job specification is stored in the specification buffer.

A job specification may be recalled, for example, by coupling the stored job specifications to a series of operating keys, with actuation of one of the keys resulting in the activation of the job specification corresponding to the key, i.e., the printer is set in accordance with the job specification. Recalling is also possible by also sending a reference to a stored job specification with a print job fed to the printing system via the data receiving means. On reception, the job specification associated with that reference is recalled from the buffer and added to the print job. Other inputting and recalling methods are possible.

The preprogramming method indicated here can be used both in the copying function and in the printer function of the printing system, and also in the hybrid function. In a further improvement, the printing system may also comprise series programming, i.e., automatically processing a number of preprogrammed job specifications on one and the same set of original images in a production run. For this purpose the printing system enables the user to combine a number of preprogrammed job specifications with a set of original images to form a print job. In addition, the submitter of a job also has the possibility of including references to different preprogrammed job specifications with a print job fed to the printing system via the data input device 2. If a print job of this kind is processed, the set of original images will first be processed in accordance with the first job specification, and then in accordance with the second job specification, and so on, until all the required job specifications have been processed. The sequence in which the job specifications are processed is not essentially important. In one embodiment, the sequence determined by the operator or job submitter is followed. In another embodiment, the sequence is determined by conditions of the printing system relating, for example, to occupation, paper stock, and so on. In yet another embodiment, print criteria are applied to each job specification of the print job so that a print job is processed divisionally in time, the permissible job specifications being processed in each case for each set of print criteria until a new set of print criteria is activated, in which case, again, a following number of job specifications of the print job are processed.

In the meantime, other print jobs or parts thereof are processed. Series programming is advantageous if prints have to be made for different departments or persons from a set of original images. These departments and persons will each have their own individual wishes regarding the copy set, depending on the nature of the function of the department or person.

By the use of series programming, the printing system is capable of delivering the required copy sets, each according to its own job specification, independently without the intervention of an operator. As a result, the automatic mode of operation of such a system used in the copying function and in the hybrid function is improved to a far-reaching degree, while in the print function efficiency is improved because only one print job is required.

It is advantageous to combine series programming with matrix sorting. If a reference to a preprogrammed job specification is indicated with P1 . . . Pn, a job specification Px is allocated in each column in FIG. 7B. Each copy set will then be processed according to the allocated job specification. It is also possible to allocate a job specification Px to each cell in the matrix shown in FIG. 7B. As a result, it is possible to allocate individually a job specification, within a required set, to each file for processing comprising one or more original images which may or may not be coded in accordance with a specific data format.

The steps indicated above relating to series programming, i.e., repeatedly processing an original image or a set original images in a production run in accordance with different job specifications, are not limited to the configurations described in the present application, but are applicable generally.

Figure 8:
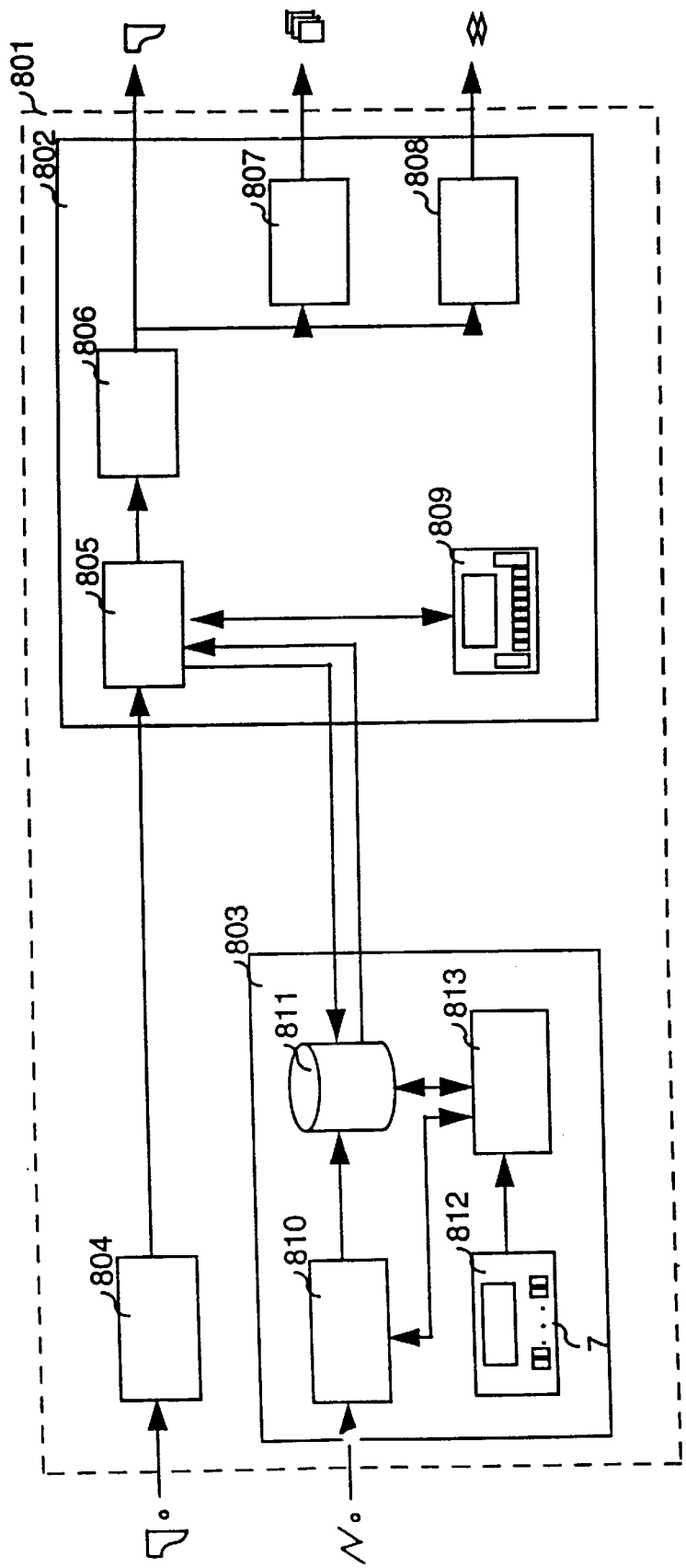
FIG. 8 is a variant of the printing system.

FIG. 8 shows a variant of the printing system in which the printing system 801 comprises three units connected by data communication lines, a print station 802, a control station 803 and a scanner 804 respectively.

The print station comprises a controller 805, a print engine 806, a number of finishing units, e.g., a sorting device 807 and a folder 808, and an operating unit 809.

The control station 803, which is in the form of a personal computer for example, comprises data input device (or interface) 810 for connection to a data network, facsimile network and/or for connection to a host computer, a memory 811 for storing print jobs, in the form of a hard disc and/or minidisc (md) system; an operator interface 812, which includes a keyboard, a VDU and a mouse; and a processor unit 813, which is so instructed or programmed that required functions are performed. Optionally, the control unit may also comprise a CD-ROM, so that a user has the possibility of including in a print job the data stored thereon.

The scanner is, for example, in the form of a page scanner with a moving flat plate, a page scanner through which the page is passed, or a microfilm scanner.

The scanner and print station are adapted to co-operate without the intervention of the control unit 803 and to form a digital copying machine. The printing system scans in and subsequently stores in the memory 811 a number of originals, whereafter these originals are then available in electronic form for inclusion in a print job.

Print jobs arrive via the data input device 810 from a host computer or via a data network. These print jobs are also stored in the memory 811. The user has the possibility of mixing image data from different sources (scanner, host computer, data network, CD-ROM) and including them in a print job. The user also has the possibility of defining a print job before all the files forming part of the job, which may originate from different sources, are present in the memory. When all the files are present, the job is automatically processed further. In a variant of the embodiment, the control station also comprises data transmission device for transmitting print jobs and/or electronic original images stored in the storage means 3. Via the operator interface 812, the user has the possibility of selecting print criteria in the manner described hereinbefore and of having the printing system operate in an automatic mode.

In one embodiment, the printing system comprises different print stations 802. Control station 803, in such an embodiment, ensures that print jobs are so allocated that the most efficient occupation of the printing units is obtained, account being taken of the characteristics of each print unit, such as available finishing units, available copy material, print quality, print speed, and so on. It is possible for a print job to be carried out divisionally at different connected print stations. For example, a number of sets is processed at a first printing station and the remaining number of sets of the print job is processed at a second print station.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A printing system for selecting print jobs, defined by job specifications, respectively, based upon reconfigurable print criteria, the printing system comprising:

a first memory for storing a set of print criteria, said print criteria including at least one criterion other than a necessity for operator intervention in a circumstance that a job specification of said given one of said stored print jobs does not match a current physical setup of a printing unit;

a second memory for storing print jobs fed to the printing system;

a third memory for queuing print jobs to be printed; and a controller, operable upon print jobs stored in the second memory, to select a print job for printing and to transfer said selected print job to the third memory if the job specification of said print job complies with the set of print criteria and to leave said print job in the second memory so as not to be queued for printing if said job specification of said print job does not comply with the set of print criteria;

said controller being operable to selectively alter the set of print criteria according to an input by a user.

2. (Amended) A printing system according to claim 1, wherein:

the controller is operable to select a print job in dependence on the job specifications of other stored print jobs.

3. A printing system according to claim 1, wherein the system further comprises:

means for preprogramming sets of print criteria into the memory; and activating means for activating a preprogrammed set.

4. A printing system according to claim 3, further comprising:

a timer, to which the activating means is responsive so as to activate a preprogrammed set at a predetermined time.

5. A printing system according to claim 1, wherein:

the print criteria are dependent upon conditions of the printing system.

6. A printing system according to claim 1, wherein:

the set of print criteria comprises a first and second subset of criteria, the second subset of print criteria being tested in dependence on an outcome of at least one test on the first subset of criteria, the first subset including at least one print criterion.

7. A printing system according to claim 1, wherein:

a print job includes data relating to the job submitter and the at least one print criterion is used to test this data.

8. A printing system according to claim 1, wherein:

the second memory for storing print jobs supplied to the printing system is organized as a queue.

9. A printing system as in claim 1, further comprising:

selection means for selecting one of an automatic mode of operation and a manual mode of operation;

wherein the controller is operative during the automatic mode.

10. In a printing system, a method for selecting print jobs, defined by job specifications, respectively, based upon reconfigurable print criteria, the method comprising:

a) storing a set of print criteria in a first memory, said print criteria including at least one criterion other than a necessity for operator intervention in a circumstance that a job specification of said given one of said stored print jobs does not match a current physical setup of a printing unit;

b) storing print jobs, that have been fed to the printing system, in a second memory;

c) queuing print jobs to be printed in a third memory; and d) selecting, if a job specification of a print job complies with the set of print criteria, said print job for printing from among print jobs stored in the second memory and transferring the selected print job to the third memory;

e) leaving, if said job specification of said print job does not comply with the set of print criteria, said print job in the second memory so as not to be queued for printing; and f) enabling a user to selectively alter the set of print criteria.

11. A method as in claim 10, wherein:

the step f) of enabling enables a user to alter at least one member of the set of print criteria from one of a default value and a value previously set by the user.

12. A method as in claim 10, wherein step d) selects a print job in dependence upon the job specifications of other stored print jobs.

13. A method as in claim 10, further comprising:

g) preprogramming a set of print criteria; and h) activating a preprogrammed set.

14. A method as in claim 13, wherein:

the step h) of activating activates a preprogrammed set at a predetermined time.

15. A method as in claim 10, wherein:

the print criteria are dependent upon conditions of the printing system.

16. A method as in claim 10, wherein:

the set of print criteria comprise a first and second subset of criteria;

the method further comprising:

g) testing the first criteria subset; and h) testing the second subset of criteria according to the outcome of the testing on the first criteria subset.

17. A method as in claim 10, wherein:

a print job includes job submitter data relating to the job submitter;

the method further comprising:

g) testing the job submitter data according to at least one member of the set of print criteria.

18. A method as in claim 10, wherein step b) organizes the second memory as a queue.

19. A computer program embodied on a computer-readable medium for causing the computer to select print jobs, defined by job specifications, respectively, based upon reconfigurable print criteria, the computer-readable-medium-embodied program comprising:

a first storing source code segment for storing a set of print criteria in a first memory, said print criteria including at least one criterion other than a necessity for operator intervention in a circumstance that a job specification of said given one of said stored print jobs does not match a current physical setup of a printing unit;

a second storing source code segment for storing print jobs, that have been fed to the printing system, in a second memory;

a queuing source code segment for queuing print jobs to be printed in a third memory;

a selecting source code segment for selecting, if a job specification of a print job complies with the set of print criteria, said print job for printing from among print jobs stored in the second memory and transferring said selected print job to the third memory;

a non-selecting source code segment for leaving, if said job specification of said print job does not comply with the set of print criteria, said print job in the second memory so as not to be queued for printing; and an enabling source code segment for enabling a user to selectively alter the set of print criteria.

20. The computer-readable-medium-embodied program according to claim 19, wherein:

the enabling source code segment enables a user to alter at least one member of the set of print criteria from one of a default value and a value previously set by the user.

21. The computer-readable-medium-embodied program according to claim 19, wherein the selecting source code segment causes the computer to select a print job in dependence upon the job specifications of other stored print jobs.

22. The computer-readable-medium-embodied according to claim 19, further including:

a preprogramming source code segment for causing the computer to preprogram a set of print criteria; and an activating source code segment for causing the computer to activate a preprogrammed set.

23. The computer-readable-medium-embodied program according to claim 22, wherein:

the activating source code segment activates a preprogrammed set at a predetermined time.

24. The computer-readable-medium-embodied program according to claim 19, wherein:

the print criteria are dependent upon conditions of the printing system.

25. The computer-readable-medium-embodied program according to claim 19, wherein:

the set of print criteria comprises a first and second subset of criteria; and wherein the computer-readable-medium-embodied program further includes:

a first testing source code segment for causing the computer to test the first criteria subset; and a second testing source code segment for causing the computer to test the second subset of criteria according to the outcome of the testing on the first criteria subset.

26. The computer-readable-medium-embodied program according to claim 19, wherein:

a print job includes job submitter data relating to the job submitter; and wherein the computer-readable-medium-embodied program further includes:

a testing source code segment for causing the computer to test the job submitter date according to at least on member of the set of print criteria.

27. The computer-readable-medium-embodied program according to claim 19, wherein:

the second storing source code segment organizes the second memory as a queue.

* * * * *